Patented July 2, 1940

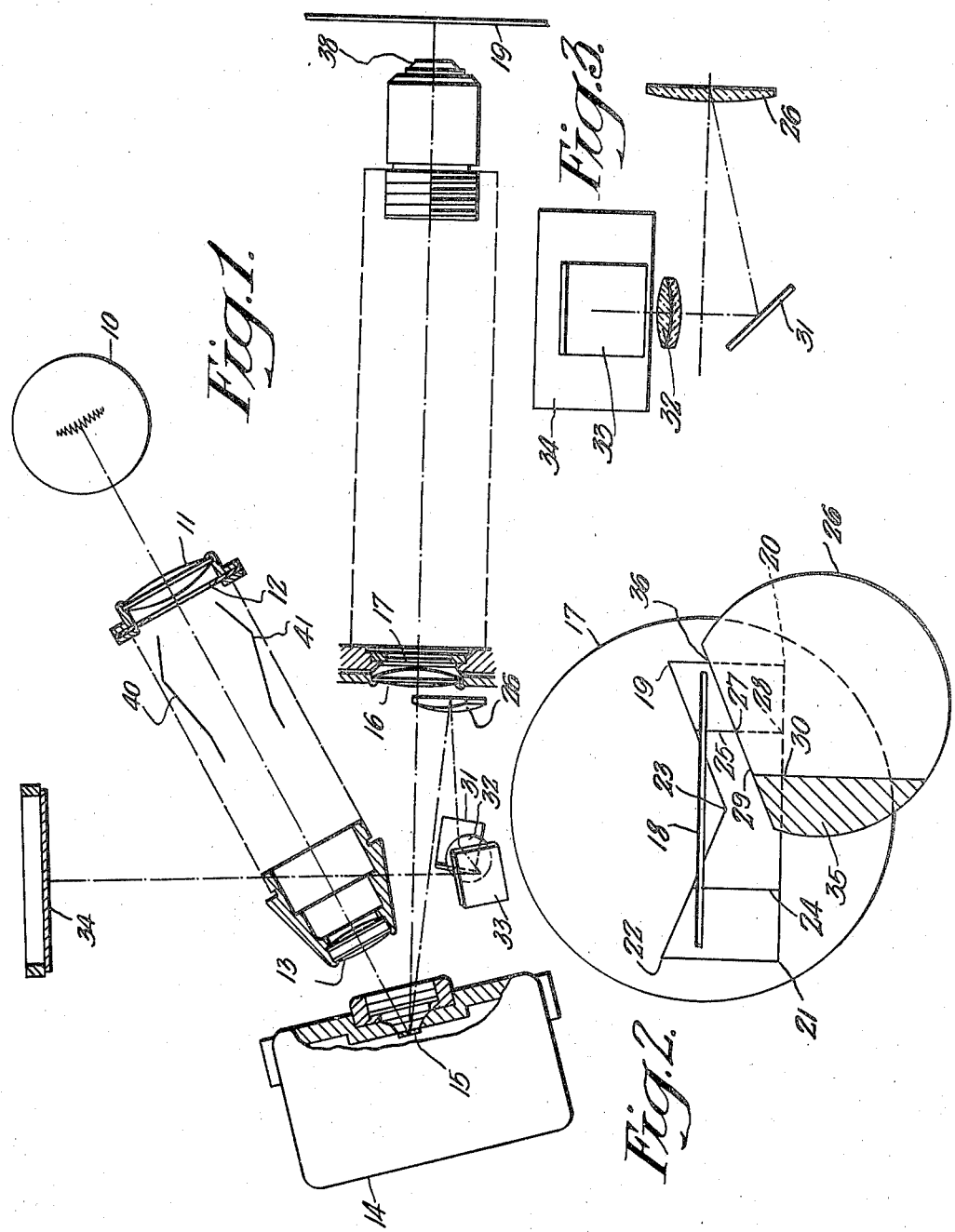

2,206,645

UNITED STATES PATENT OFFICE 2,206,645

MONITORING OPTICAL SYSTEM FOR SOUND FILM APPARATUS

Lawrence T. Sachtleben, Camden, N. J., assignor to Radio Corporation of America, a corporation of Delaware Application September 30, 1938, Serial No. 232,640

4 Claims. (Cl. 179—100.3)

This invention relates to monitoring optical systems for sound film recording apparatus and more particularly to such a monitoring system particularly adapted for use with commercial types of variable area recording apparatus and with practically all varieties of optical systems used in connection with what is commercially known as the RCA Photophone recording apparatus.

The invention involves the use of a system of lenses and mirrors which pick up a portion of the light beam directed toward the slit which is imaged upon the film, and direct and focus this portion of the light beam upon a monitoring screen without interfering with the light transmitted through the slit.

One object of the invention is to provide an improved visual monitoring system.

Another object of the invention is to provide a visual monitoring system which permits inspection of the ground noise reduction control in a sound recording device.

Another object of the invention is to provide a monitoring optical system which permits simultaneous observation of the ground noise reduction control and of the modulation in a sound recording optical system.

Other and incidental objects of the invention will be apparent to those skilled in the art from a reading of the following specification and an inspection of the accompanying drawing in which Figure 1 is a plan view partly in section of a commercial recording optical system including my improved monitoring construction, Fig. 2 is a view of the slit plate 17 and lens 26 taken from the left side of Figure 1, and Figure 3 is an elevation looking toward the screen 34 and showing the lenses 26 and 32 in section.

Referring first to Fig. 1, light from the usual exciter lamp 10 passes through the condenser 11 to the aperture plate 12, which defines the shape of the light beam. This light beam is directed upon the mirror 15 of the galvanometer 14 by the lens 13 which, in conjunction with the lens 11, focuses an image of the filament of the lamp 10 upon the mirror 15.

This mirror 15, which is vibratable about a horizontal axis in accordance with the sound vibrations to be recorded, directs the light to the lens 16 and the slit plate 17. Light passing through the slit 18 (Fig. 2) in the slit plate 17 is focused by the objective 38 upon the film 19.

The aperture in the plate 12 is of the shape shown at 19, 20, 21, 22, 23 in Fig. 2 and is imaged upon the slit plate 17 by the lens 13, assisted somewhat by the lens 16. The lens 16 images the galvanometer mirror 15 on the entrance pupil of the objective 38, as is customary.

Shutters 40 and 41 are provided adjacent the slit plate 12, which shutters are moved in accordance with the envelope of the sound waves to be recorded. These shutters are preferably constructed and actuated as described in Hasbrouck Patent No. 2,102,778, issued December 21, 1937.

The shutters 40 and 41 so intercept the light beam 19, 20, 21, 22, 23 that, when they are in their most nearly closed position, the beam is defined at its sides by the lines 24 and 25 and this condition occurs at minimum signal amplitude, at which time the light beam is being vibrated a minimum amount vertically across the slit 18.

The vertical vibration of the light beam is limited by the vertical height of the sides 19, 23 and 22, 23. It will be apparent that, in order to properly see the action of the recording beam, it is necessary to simultaneously see the movement of the vertical lines defining the lateral margins of the beam 21, 22 or 19, 20 to the positions 24 or 25, and also to see the vertical movement of the beam corresponding to the movements of the lines 19, 23 and 22, 23 across the slit 18.

In order to accomplish this, I provide a lens 26 of the plano-convex type, which is silvered on the back over most of its area. One edge of the lens 26 is cut off at 29, 36 along a chord which is arranged parallel to the line 19, 23. A second portion of the lens 26 at 35 is rendered nonreflecting. It will be apparent that, whatever portion of the light beam is defined by the line 36, 29, the line 29, 30, the line 30, 20, and the line 20, 36 will be reflected from the reflecting surface of the mirror. If the shutter 40 moves closer to the optical axis of the system, then the line 19, 20 will move inwardly until it may occupy the position 25, at which time the reflected portion of the beam will be defined by 27, 28, 30, 29, and, whatever the position of the shutter, this trapezoidal portion of the light beam will be vibrated up and down in accordance with the movements of the light beam caused by oscillation of the galvanometer mirror 15.

The lens 26 is located at such a position that light traveling along the optical axis of the lens system 16, 18 and incident on the mirror, will be reflected to the diagonal mirror 31, located below the optical axis. From the mirror 31 the light is directed vertically through the lens 32 to a second diagonal mirror 33, which in turn is located at such an angle as to direct the light beam upon the viewing screen 34. The lens 32 is an achromatic lens of such focal length as to focus a sharply defined image of the portion of the beam reflected from the mirror lens 26 upon the screen 34 at approximately five diameters magnification.

The lens 26 is of such focal length as to image the galvanometer mirror 15 approximately in the lens 32. A concave mirror may replace the silvered positive lens 26.

Due to the angles of the mirrors 31 and 33, the light beam directed upon the screen 34 will be inverted and rotated approximately 90° from its position as shown in Fig. 2. The shutter image 27, 28 will appear toward the top of the viewing screen 34 as a horizontal line which moves up or down in accordance with the movement of the shutter and the lower margin of the trapezoid defined by the line 20, 21 will appear toward the left side of the screen 34 as a vertical line which vibrates horizontally in accordance with the sound waves being recorded. The bottom and diagonal edges which are determined by the lines 29, 30 and 26, 29 of the lens mirror 36 remain stationary upon the screen.

Having now described my invention I claim:

1. In combination with an optical system including a slit plate having a slit through which light is directed to a film, a monitoring system including a reflector adjacent to said slit plate adapted to reflect light reaching said slit plate adjacent to said slit back along a path at a slight angle to its original path, a second reflector arranged at an angle of the order of 45 degrees to the path of said reflected light for reflecting the reflected light approximately vertically to clear the optical system, a third reflector arranged at an angle of the order of 45 degrees to said vertically reflected beam of light for directing substantially horizontally to a monitoring screen, and a positive lens between said second and third reflectors for focusing said beam of light upon said monitoring screen.

2. In combination with an optical system including a slit plate having a slit through which light is directed to a film, a monitoring system including a reflector adjacent to said slit plate adapted to reflect light reaching said slit plate adjacent to said slit back along a path at a slight angle to its original path, said reflector consisting of a plano convex lens having its plano surface silvered, a second reflector arranged at an angle of the order of 45 degrees to the path of said reflected light for reflecting the reflected light approximately vertically to clear the optical system, a third reflector arranged at an angle of the order of 45 degrees to said vertically reflected beam of light for directing substantially horizontally to a monitoring screen, and a positive lens between said second and third reflectors for focusing said beam of light upon said monitoring screen.

3. In combination with a sound recording optical system including an aperture plate defining a beam of predetermined configuration, at least one shutter defining the size of said beam in accordance with the amplitude of sounds to be recorded, a slit plate having a slit through which light is adapted to be directed upon a sound record film and a galvanometer for directing said beam to and vibrating it across the slit in said slit plate, a monitoring system including a reflector adjacent to said slit plate adapted to reflect light reaching said slit plate adjacent to said slit back along a path at a slight angle to its original path, a second reflector arranged at an angle of the order of 45 degrees to the path of said reflected light for reflecting the reflected light approximately vertically to clear the optical system, a third reflector arranged at an angle of the order of 45 degrees to said vertically reflected beam of light for directing substantially horizontally to a monitoring screen, and a positive lens between said second and third reflectors for focusing said beam of light upon said monitoring screen.

4. In combination with a sound recording optical system including an aperture plate defining a beam of predetermined configuration, at least one shutter defining the size of beam in accordance with the amplitude of sounds to be recorded, a slit plate having a slit through which light is adapted to be directed upon a sound record film and a galvanometer for directing said beam to and vibrating it across the slit in said slit plate, a monitoring system including a reflector adjacent to said slit plate adapted to reflect light reaching said slit plate adjacent to said slit back along a path at a slight angle to its original path, said reflector consisting of a plano convex lens having its plano surface silvered, a second reflector arranged at an angle of the order of 45 degrees to the path of said reflected light for reflecting the reflected light approximately vertically to clear the optical system, a third reflector arranged at an angle of the order of 45 degrees to said vertically reflected beam of light for directing substantially horizontally to a monitoring screen, and a positive lens between said second and third reflectors for focusing said beam of light upon said monitoring screen.

LAWRENCE T. SACHTLEBEN.